United States Patent Office 3,419,237
Patented Dec. 31, 1968

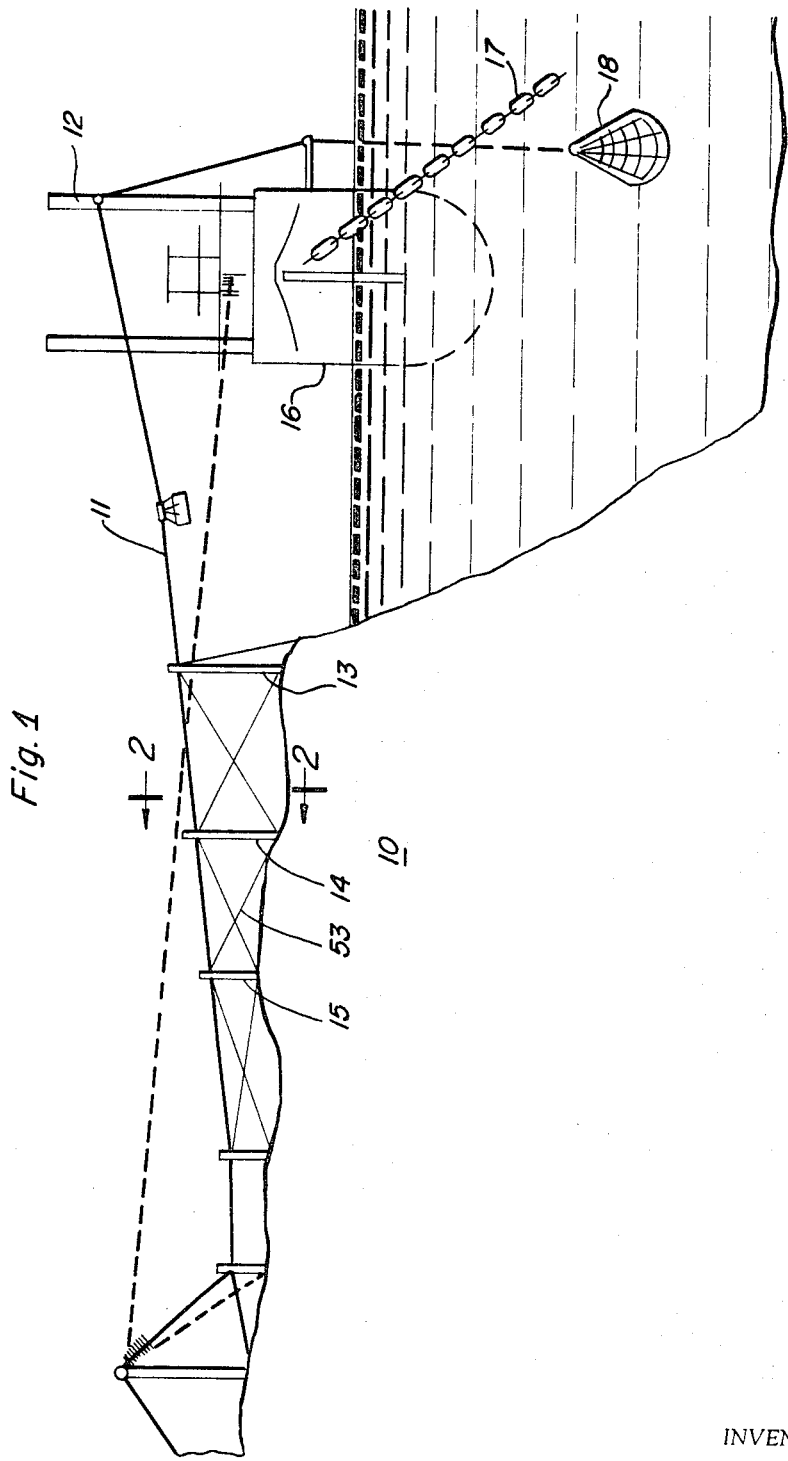

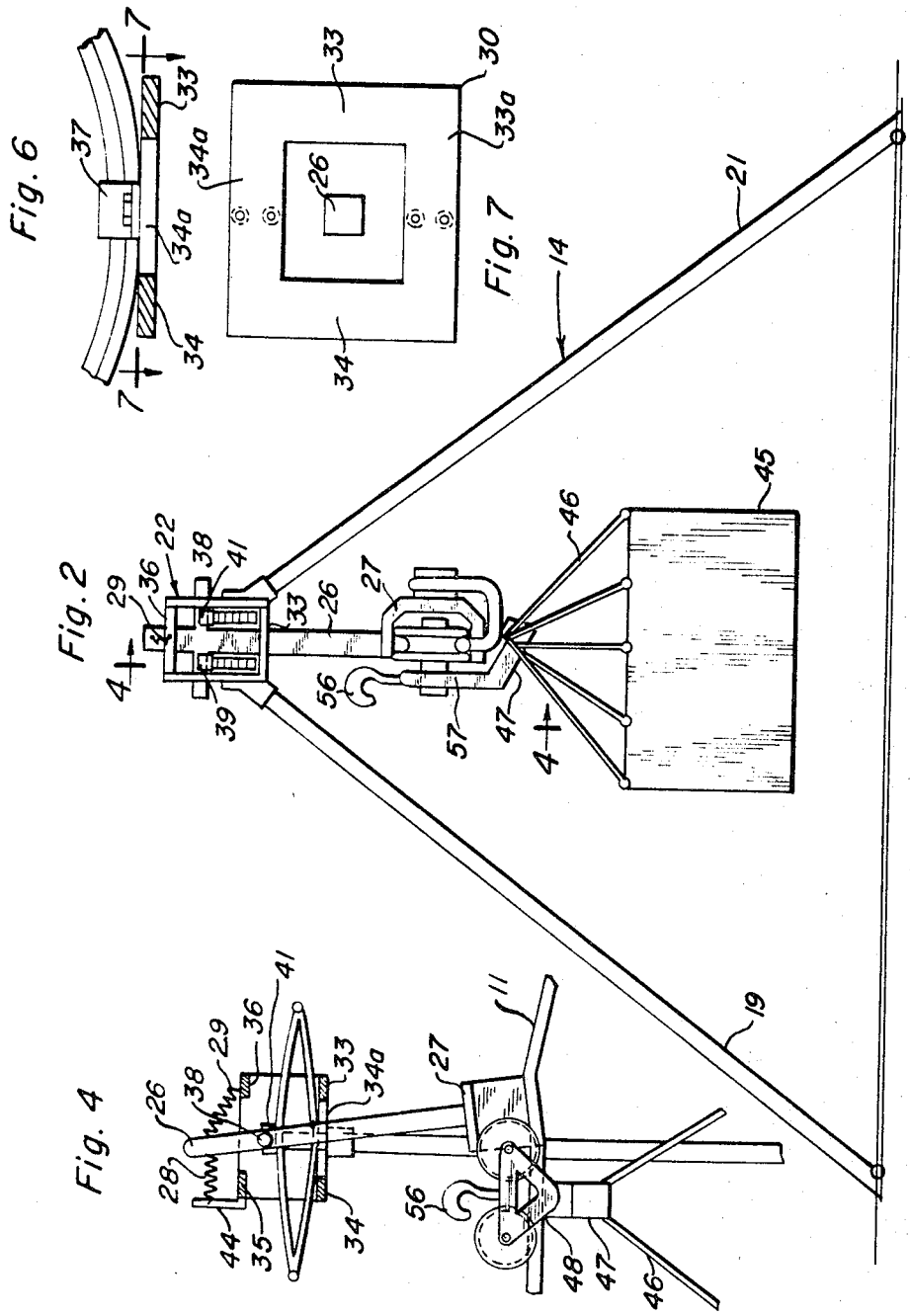

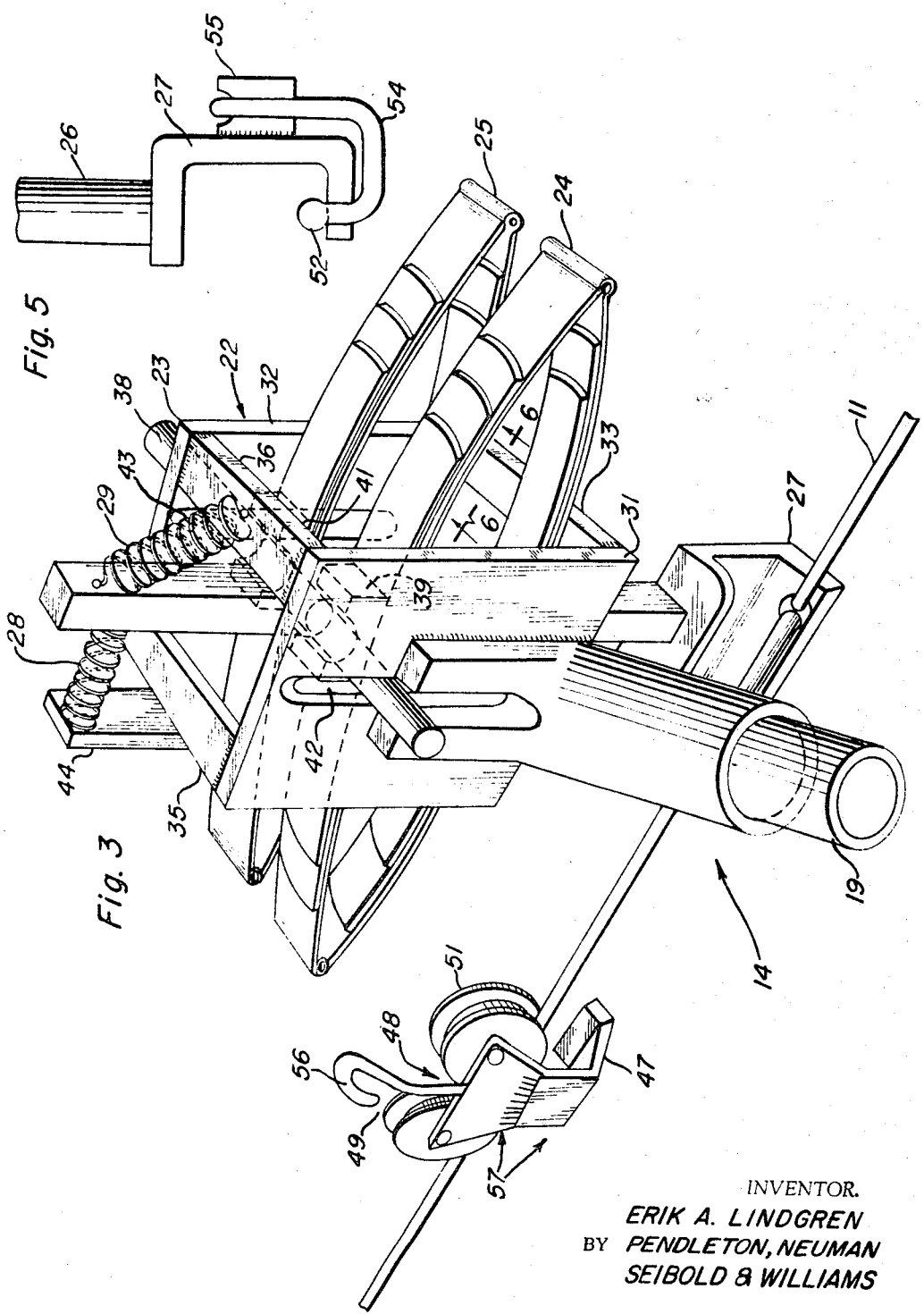

3,419,237
SHOCK ABSORBING APPARATUS
Erik A. Lindgren, 4700 N. Ashland Ave.,
Chicago, Ill. 60640
Filed Nov. 21, 1966, Ser. No. 595,867
11 Claims. (Cl. 248—54)

ABSTRACT OF THE DISCLOSURE

An apparatus for cushioning the impact to the support of a suspension cable upon which a load conveyor is adapted to run. The apparatus comprises a framework supported by a plurality of ground-engaging legs, the framework having bottom, side and top portions. A cable suspending means is provided including a transverse pinion or guide member, and the side portions of the framework are slotted to cooperate with the guide member in controlling the vertical movements of the cable suspending means. A pair of leaf springs are mounted on the bottom portion of the framework, and bearing means on the leaf springs pivotally receive the guide member. The leaf springs thus resiliently hold the guide member in a linearly central position, and a second spring means acting between the framework and the cable suspending means resiliently holds the cable suspending means in a pivotal central position.

---

This application relates to shock absorbing apparatus; more particularly, to shock absorbing apparatus for use in connection with cable conveyors and supports therefor wherein the loads to be carried move transversely to the direction of shock absorbing action, and, it is an object of the invention to provide improved apparatus of this character.

The invention, in one application, is intended to be used in connection with temporary installations, for example, as in connection with ship unloading operations carried out by military or naval personnel in areas having no permanent or fixed docking or unloading facilities. In such situations the ship must necessarily anchor away from the immediate shore, depending upon the water depth, thereby presenting the problem of how to convey material on board ship to some docking or dumping facility on shore. It is desired to make use, to as full an extent as possible, of the shipboard crane and hoist facilities. To this end, the invention has application to cable suspending apparatus which may be constructed simply and quickly. Moreover, the cable suspending apparatus, and thus the load suspending apparatus, while very sturdy, must be, nevertheless, of a generally temporary construction insofar as bracing and rigidity are concerned. Loads carried by slings or the like on a cable supported conveyor, extending between shipboard and shore, achieve substantial velocities and thus move past the cable supports at these high velocities. Consequently, substantial shocks are exerted upon the cable supports, not only vertically, but longitudinally because of the flexibility in the suspending cable and in the bracing or guy wires for these supports.

Accordingly, it is a further object of the invention to provide improved apparatus of the character indicated which provides vertical as well as horizontal shock absorbing.

While the invention may have particular usefulness in connection with apparatus as described, it is also intended to be useful in a shock absorbing capacity where other types of loads are to be lifted or deposited vertically, such as by raising or lowering from a helicopter, for example.

In carrying out the invention in one form, apparatus for cushioning the impact to the support of a suspension cable upon which a load conveyor is adapted to run is provided comprising support means, cable suspension means, first spring means for supporting said cable suspension means on said support means in a linearly central position, linearly movable and pivotally movable means attaching said cable suspension means to said support means and to said first spring means, respectively, and second spring means for holding said cable suspension means in a pivotally central position.

In carrying out the invention according to another form, shock absorbing apparatus is provided comprising a supporting framework having a bottom portion and side portions, leaf spring means attached at one side to said bottom portion, load suspension means including a guide member, and pivotal bearing means pivotally attaching said load suspension means to said leaf spring means at the other side thereof.

Other objects and purposes of the invention will become clear as the description proceeds.

For a more complete understanding of the invention reference should be had to the accompanying drawings in which:

FIGURE 1 illustrates diagrammatically a ship unloading facility to which the invention may be readily adapted.

FIG. 2 is a view, somewhat schematic, taken substantially in the direction of the arrows 2—2 of FIG. 1.

FIG. 3 is a fragmentary view, in perspective, on a larger scale, of shock absorbing apparatus shown in FIG. 2.

FIG. 4 is a side view, somewhat schematic and partially in section, taken substantially in the direction of arrows 4—4 of FIG. 2, illustrating one operational aspect of the invention.

FIG. 5 is a view, in somewhat greater detail, illustrating one manner of cable attachment.

FIG. 6 is a fragmentary view (full width) taken substantially in the direction of the arrows 6—6 of FIG. 3; and FIG. 7 is a fragmentary view taken substantially in the direction of arrows 7—7 of FIG. 6.

Referring to the drawings, the invention is shown embodied in a ship unloading facility 10 comprising a suspension cable 11 attached at one end to a framework 12 on board ship and attached at various points to supports 13, 14, 15, etc., on shore. As many supports on land may be used as is necessary to meet the load requirements in any particular situation. The ship, shown schematically by reference character 16, is held by an anchor chain or the like 17 and is shown with a counterweight 18 attached to the seaward side for balancing the heavy loads moving toward shore.

Referring to FIG. 2, the ground support 14 is shown on an enlarged scale, it being understood that this support is typical of all other ground supports. Accordingly, the ground support 14 comprises legs 19 and 21 and shock absorbing mechanisdm 22 supported thereon. Legs 19 and 21 may be of any suitable construction, such as the pipes illustrated (FIG. 3) or of other construction, for example, such as steel eye beams, channels or the like.

Referring to FIG. 3, the shock absorbing mechanism may be seen to comprise a framework 23, a pair of double leaf springs 24 and 25, a cable suspending member including a vertical bar 26 and an attached cable holder 27, and springs 28 and 29 for stabilizing movements of the vertical member 26.

The framework 23 comprises a pair of side members 31 and 32, a bottom member 30 (FIG. 7) including end parts 33 and 34 and side parts 33a and 34a, and a pair of top members 35 and 36. The top members 35 and 36 are shown welded to the side members 31 and 32 and the bottom side parts 33a and 34a are similarly attached so as to form, essentially, a box-like rigid construction. Other schemes of attachment may be used as will occur to those skilled in the art. Top members 35 and 36 are spaced apart from each other so as to provide a space within which the vertical bar 26 may move, as will become clear. Bottom end parts 33 and 34 are similarly spaced apart.

The leaf springs 24 and 25, as shown, are double leaf springs, the bottom members of which are attached to bottom side parts 33a and 34a by means of suitable U-shaped clamps 37 (FIG. 6). A transverse member 38 is attached to vertical bar 26, for example, as by passing through a suitable hole therein, and is pivotally mounted on the upper portions of leaf springs 24 and 25 by a pair of bearings 39 and 41. The side members 31 and 32 include vertical slots 42 and 43 within which vertical movements of member 38 may occur. A vertical abutment 44 is attached to member 35 and compression spring 28 is mounted between the abutment 44 and the vertical bar 26. The spring 29, as shown, is a compression spring attached at one end to top member 36 and at the other end to vertical bar 26.

The legs 19 and 21 may be attached to the side members 31 and 32 in any suitable manner, such as by appropriate couplings welded to the side members.

With the foregoing description of structure in mind, the operation of the device may now be understood from the following elaboration.

The load 45 is suspended by appropriate slings 46 from hook 47 forming part of a carrier 48 whose grooved pulleys 49 and 51 run on cable 11 and come into engagement with that part of the cable attached to cable holder 27. As a load moves into this position, the weight of the load causes the cable holder 27 and the vertical bar 26 to move downwardly, which motion is permitted by downward deflection of the leaf springs 24 and 25 and by movement of member 38 in the grooves 42 and 43. As the grooved pulleys move past the cable holder 27, the load thereon is removed, whereupon the leaf springs 24 and 25 deflect upwardly. Upward and downward oscillation will persist for a short time depending upon the damping effect introduced by the various frictional forces involved, including that within the leaf springs themselves. By virtue of the downward deflection of the cable holder 27 and the associated mechanism, shocks to the leg members 19 and 21, their associated footings and other components are very substantially diminished.

When the grooved pulleys 49 and 51 engage the cable holder 27 there is a tendency for the cable holder to move longitudinally in the direction of load movement as may be visualized more specifically in FIG. 4, wherein the vertical bar 26 is shown in deflected position. Such deflection of vertical bar 26 is pivotal in nature and is provided for by the pivoting of the member 38 upon bearings 39 and 41 on the upper portions of leaf springs 24 and 25. The pivotal deflection of vertical bar 26 is resisted by both springs 28 and 29, one in compression and the other in tension and, after the conveyor has passed, springs 28 and 29 return the vertical bar 26 to its central position after a short series of damped oscillations. The damping, in this case also, occurs by virtue of frictional forces existing in the system, including that within the springs and that engendered by the movements of cable 11. The deflection of cable support 27 and of the vertical bar 26 upon the exertion of longitudinal forces diminishes very substantially the longitudinal shock applied to the bracing or guy wire system 53 existing between the various vertical supports.

While the spring members 24 and 25 are shown as leaf springs, other spring-like members or materials may be used and it is intended that reference to springs or spring members shall include materials or articles having resilience as well as damping, such, for example, as rubber-like materials. Similarly, springs 28 and 29 may be coil or other spring forms made of steel or other spring-like members including resilience as well ts damping.

The cable 11 may be attached to cable holder 27 in a suitable manner and, as shown, is attached by virtue of a loop 54 of cable passing through appropriate holes in cable holder 27 and being looped over an abutment 55 attached, as by welding, to the rear portion of holder 27.

The hook 56 or the like may be attached to the carrier frame 57 from which the hook 47 depends. A crane may conveniently engage hook 56 and lift the attached load 45 onto the suspending cable 52.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Apparatus for cushioning the impact to the support of a suspension cable upon which a load conveyor is adapted to run comprising: support means, cable suspending means, first spring means for supporting said cable suspending means on said support means in a linearly central position, linearly movable and pivotally movable means attaching said cable suspending means to said support means and to said first spring means, respectively, and second spring means for holding said cable suspending means in a pivotally central position.

2. Apparatus according to claim 1 wherein said first spring means comprises at least one leaf spring.

3. Apparatus according to claim 1 wherein said first spring means comprises two leaf springs, one on each side of said cable suspending means.

4. Apparatus according to claim 1 wherein said second spring means comprises at least one spring.

5. Apparatus according to claim 1 wherein said second spring means comprises two springs, one on each side of said cable suspending means.

6. Apparatus according to claim 1 wherein said second spring means comprises at least one coiled spring.

7. Apparatus for cushioning the impact to the support for a suspending cable upon which a load conveyor is adapted to run comprising: support means including legs for ground engagement and a framework supported by said legs, said framework having bottom means, side means and top means, cable suspending means including a guide member, slot means on said side means for cooperation with said guide member in controlling vertical movements of said cable suspending means, first spring means mounted on said bottom means, bearing means mounted on said first spring means for pivotally receiving said guide member, said first spring means holding said cable suspending means in a linearly central position, and second spring means attached to said framework and said cable suspending means for holding said cable suspending means in a pivotally central position.

8. Apparatus according to claim 7 wherein said first spring means comprises two leaf springs, one on each side of said cable supporting means.

9. Apparatus according to claim 7 wherein said second spring means comprises two springs, one on each side of said cable suspending means and attached to said top means.

10. Apparatus for cushioning the impact to a support of a load moving substantially horizontally across said support, said apparatus comprising: a supporting framework having a transverse portion, leaf spring means attached at one side to said transverse portion, load suspending means, pivotal means attaching said load suspending means to said leaf spring means at the other side thereof for swinging movement about a substantially horizontal axis, and means guiding said pivotal means for substantially vertical linear movement with respect to said supporting framework.

11. Apparatus for cushioning the impact to a support of a load moving substantially horizontally across said support, said apparatus comprising: a supporting framework, load supporting means having an arm including a transverse pinion, means mounting said pinion on said framework for swinging movement of said arm about a substantially horizontal axis and for sliding movement of said pinion along a substantially vertical linear path, first spring means resiliently resisting the sliding movement of said pinion, and second spring means resiliently resisting the swinging movement of said arm.

References Cited

UNITED STATES PATENTS

| 1,803,130 | 4/1931 | Parker | 267—36 |
| 2,844,187 | 7/1958 | Scoville | 248—18 X |
| 2,867,399 | 1/1959 | Alexeff | 248—54 |

CHANCELLOR E. HARRIS, *Primary Examiner.*

U.S. Cl. X.R.

104—115; 267—42